(12) United States Patent
Takahashi et al.

(10) Patent No.: US 10,723,350 B2
(45) Date of Patent: Jul. 28, 2020

(54) DRIVING ASSISTANCE APPARATUS AND DRIVING ASSISTANCE METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Toru Takahashi, Kariya (JP); Yosuke Ito, Kariya (JP); Masayasu Tanase, Toyota (JP); Wataru Ike, Toyota (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 16/064,625

(22) PCT Filed: Dec. 18, 2016

(86) PCT No.: PCT/JP2016/087695
§ 371 (c)(1),
(2) Date: Jun. 21, 2018

(87) PCT Pub. No.: WO2017/110702
PCT Pub. Date: Jun. 29, 2017

(65) Prior Publication Data
US 2019/0001970 A1   Jan. 3, 2019

(30) Foreign Application Priority Data

Dec. 25, 2015   (JP) .................................. 2015-254471

(51) Int. Cl.
*B60W 30/09*   (2012.01)
*B60T 7/12*    (2006.01)
(Continued)

(52) U.S. Cl.
CPC ............. *B60W 30/09* (2013.01); *B60Q 9/008* (2013.01); *B60T 7/12* (2013.01); *B60W 10/18* (2013.01);
(Continued)

(58) Field of Classification Search
CPC .... B60W 30/09; B60W 30/095; B60W 50/14; B60Q 9/008; G08G 1/16
See application file for complete search history.

(56) References Cited

U.S. PATENT DOCUMENTS

2017/0043753 A1* 2/2017 Johnson ..................... B60T 7/22
2017/0166172 A1* 6/2017 Kwon ....................... B60T 7/22
(Continued)

FOREIGN PATENT DOCUMENTS

JP   2003-165461 A      6/2003
JP   2003165461 A  *   6/2003
(Continued)

*Primary Examiner* — Anne Marie Antonucci
*Assistant Examiner* — Andrew J Cromer
(74) *Attorney, Agent, or Firm* — Maschoff Brennan

(57) ABSTRACT

A driving assistance apparatus determines, based on an instantaneous indicator which is an instantaneous value of a parameter regarding steering of the own vehicle, whether a driver has started a collision avoidance operation for avoiding a collision between a target and the own vehicle. When it is determined that the collision avoidance operation has been started, a support start timing for starting driving assistance for avoiding the collision or reducing collision damage is set to be a timing later than when the collision avoidance operation has not been started. The support start timing during a collision avoidance time period which is a time period until a predetermined set time has elapsed after it is determined that the collision avoidance operation has been started is set based on a time-dependent indicator for (Continued)

steering indicated by the instantaneous indicator at timings during the collision avoidance time period.

10 Claims, 6 Drawing Sheets

(51) Int. Cl.
| | |
|---|---|
| *B60W 10/18* | (2012.01) |
| *B60W 10/20* | (2006.01) |
| *G08G 1/16* | (2006.01) |
| *B60Q 9/00* | (2006.01) |
| *B60W 50/00* | (2006.01) |
| *B60W 50/14* | (2020.01) |
| *B60W 50/08* | (2020.01) |

(52) U.S. Cl.
CPC ........ *B60W 10/20* (2013.01); *B60W 50/0098* (2013.01); *B60W 50/14* (2013.01); *G08G 1/16* (2013.01); *G08G 1/166* (2013.01); *B60W 50/087* (2013.01); *B60W 2050/0082* (2013.01); *B60W 2050/143* (2013.01); *B60W 2510/205* (2013.01); *B60W 2520/10* (2013.01); *B60W 2540/12* (2013.01); *B60W 2540/18* (2013.01); *B60W 2554/00* (2020.02); *B60W 2554/80* (2020.02); *B60W 2710/18* (2013.01)

(56) References Cited

U.S. PATENT DOCUMENTS

| | | | |
|---|---|---|---|
| 2018/0118203 | A1 | 5/2018 | Minemura et al. |
| 2018/0118205 | A1 | 5/2018 | Minemura et al. |

FOREIGN PATENT DOCUMENTS

| | | | | |
|---|---|---|---|---|
| JP | 2007-083816 | A | | 4/2007 |
| JP | 2007-153196 | A | | 6/2007 |
| JP | 2007153196 | A | * | 6/2007 |
| JP | 2008-137467 | A | | 6/2008 |
| JP | 2008137467 | A | * | 6/2008 |
| JP | 2011-218885 | A | | 11/2011 |
| JP | 2012-103969 | A | | 5/2012 |
| JP | 2016-001498 | A | | 1/2016 |
| JP | 2016-190613 | A | | 11/2016 |
| JP | 2016-192165 | A | | 11/2016 |

* cited by examiner

DRIVING ASSISTANCE APPARATUS AND DRIVING ASSISTANCE METHOD

CROSS-REFERENCE TO RELATED APPLICATION

This application is based on and claims the benefit of priority from earlier Japanese Patent Application No. 2015-254471 filed on Dec. 25, 2015, the disclosures of which is incorporated herein by reference.

TECHNICAL FIELD

The present disclosure relates to a driving assistance technique for avoiding a collision between the own vehicle and an object or reducing collision damage.

BACKGROUND ART

Pre-crash safety systems (PCS) have been developed as a safety system for avoiding a collision between a vehicle and an obstacle which is present around the vehicle or reducing collision damage. A PCS calculates a time to collision (TTC) which is time until a vehicle collides with an obstacle. Based on the calculated time to collision, the PCS issues an alarm to a driver of the own vehicle or activates a braking apparatus of the vehicle (see, for example, Patent Literature 1). Patent Literature 1 discloses that a risk level indicating a risk of collision between a vehicle and an obstacle is set and according to the set risk level, information is presented to a driver.

CITATION LIST

Patent Literature

[PTL 1] JP 2012-103969 A

SUMMARY OF THE INVENTION

Technical Problem

When driving assistance for avoiding a collision or reducing collision damage is performed, if the driving assistance is started early even though the driver has demonstrated an intention to avoid a collision with an obstacle, the driver is annoyed by the start of the driving assistance. Meanwhile, in a situation (uncertain situation) where the driver has not clearly demonstrated an intention to avoid a collision between the vehicle and the obstacle, the driving assistance needs to be started without delay.

An object of the present disclosure is to provide a driving assistance apparatus and a driving assistance method which are capable of starting, at an appropriate timing, driving assistance for avoiding a collision between the own vehicle and an object or reducing collision damage.

Solution to Problem

An aspect of a technique of the present disclosure has employed the following means.

A driving assistance apparatus (10) of the present disclosure includes: a target recognition section which recognizes a target which is present around the own vehicle (40); an operation determination section which determines, based on an instantaneous indicator which is an instantaneous value of an indicator regarding steering of the own vehicle, whether a driver has started a collision avoidance operation for avoiding a collision between the own vehicle and the target recognized by the target recognition section; a timing calculation section which, in the case where the operation determination section determines that the collision avoidance operation has been started, sets a support start timing to be a late timing which is later than the support start timing for a case where the collision avoidance operation has not been started, the support start timing being a timing at which driving assistance for avoiding a collision between the own vehicle and the target or reducing collision damage is started; and a control section which starts the driving assistance based on the support start timing set by the timing calculation section. The timing calculation section sets the support start timing during a collision avoidance time period based on a time-dependent indicator for steering which is indicated by using the instantaneous indicator at a plurality of timings during the collision avoidance time period, the collision avoidance time period being a time period until a predetermined set time has elapsed after the operation determination section determines that the collision avoidance operation has been started.

An indicator for evaluating whether a driver has demonstrated an intention to avoid a collision includes an indicator regarding steering of the own vehicle. The indicator regarding steering of the own vehicle includes, for example, a steering angle, a steering angular velocity, a yaw rate, and the like. These are indicated by an instantaneous indicator which is an instantaneous value or a time-dependent indicator such as an amount of change or an average value during a predetermined time. The instantaneous indicator is high in responsiveness after the steering is started but is more likely to be influenced by noise or instantaneous steering. Meanwhile, the time-dependent indicator is low in responsiveness but is less likely to be influenced by noise or instantaneous steering.

Focusing on such points, the above configuration of the driving assistance apparatus of the present disclosure achieves the following. Specifically, the driving assistance apparatus of the present disclosure has responsiveness which, when a driver has demonstrated an intention to avoid a collision, enables immediate determination that the driver has the intention to avoid a collision. Furthermore, the driving assistance apparatus of the present disclosure is capable of suppressing start of the driving assistance at an inappropriate timing. The inappropriate timing includes, for example, a start timing based on noise or instantaneous steering such as steering which is not the collision avoidance operation. Thus, the driving assistance apparatus of the present disclosure is capable of starting, at an appropriate timing, the driving assistance for avoiding a collision or reducing collision damage.

DESCRIPTION OF THE EMBODIMENTS (First Embodiment)

Figure 1:
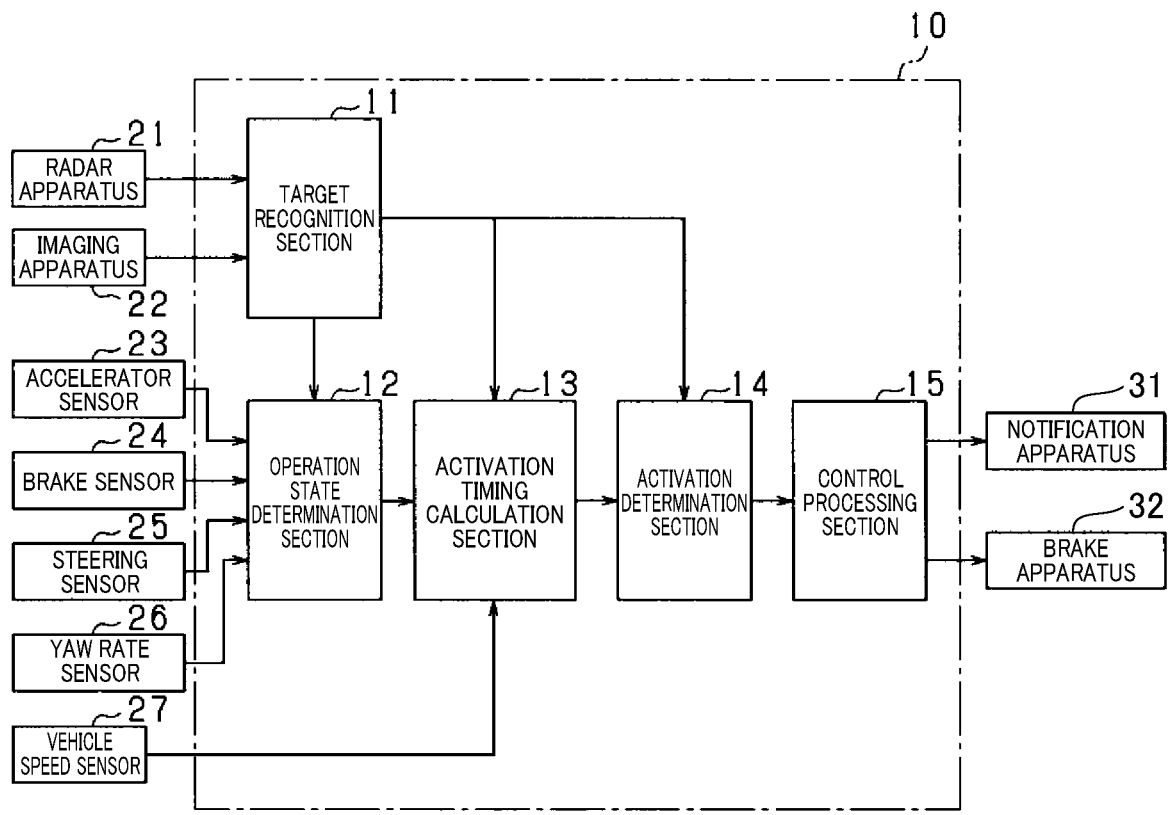
FIG. 1 is a block diagram showing a schematic configuration of a driving assistance apparatus.

The following will describe a first embodiment with reference to the drawings. In the following embodiments, the same or equivalent parts are given the same reference numerals in the drawings, and descriptions of the parts given the same reference numerals are referred to. A driving assistance apparatus of the present embodiment is mounted on a vehicle, detects a target which is present around the own vehicle, and performs driving assistance. Thus, the driving assistance apparatus of the present embodiment functions as a PCS system which performs various types of control for avoiding a collision between the own vehicle and the target or reducing collision damage.

A driving assistance apparatus 10 is a computer which includes components such as a CPU, a ROM, a RAM, and an I/O device. The CPU executes a program installed in the ROM so that the driving assistance apparatus 10 achieves functions shown in FIG. 1. The driving assistance apparatus 10 is connected to each of a radar apparatus 21 and an imaging apparatus 22 which are sensor apparatuses detecting a target which is present around the own vehicle. From the sensor apparatuses, detected information about the target is inputted into the driving assistance apparatus 10.

The radar apparatus 21 is, for example, a publicly known millimeter wave radar in which transmission waves are high frequency signals in a millimeter-wave band. The radar apparatus 21 is mounted at a front end of the own vehicle and detects a target which is present in a region (predetermined detection region) with a predetermined detection angle. The radar apparatus 21 acquires information such as a distance between the detected target and the own vehicle, a relative velocity of the target to the own vehicle, and a direction of the target, and transmits the acquired information about the target to the driving assistance apparatus 10. The imaging apparatus 22 is, for example, an apparatus such as a CCD camera, a CMOS image sensor, or a near infrared camera. The imaging apparatus 22 is mounted at a predetermined height at a center in a vehicle width direction of the vehicle. The imaging apparatus 22 captures, from a bird's-eye view, an image of a region (predetermined image capture region) extending over a predetermined angular range towards an area ahead of the own vehicle. The imaging apparatus 22 extracts, from the captured image, a characteristic point indicating presence of the target and transmits a result of the extraction of the characteristic point to the driving assistance apparatus 10.

In addition, the vehicle is equipped with, for example, various vehicle sensors such as an accelerator sensor 23, a brake sensor 24, a steering sensor 25, a yaw rate sensor 26, and a vehicle speed sensor 27. The accelerator sensor 23 detects an amount of operation of an accelerator pedal.

The brake sensor 24 detects an amount of operation of a brake pedal. The steering sensor (steering angle sensor) 25 detects a steering angle of a steering wheel. The yaw rate sensor 26 detects an angular velocity (yaw rate) of the own vehicle in a rotation direction. The vehicle speed sensor 27 detects a vehicle speed of the own vehicle (hereinafter referred to as "own vehicle speed").

As shown in FIG. 1, the driving assistance apparatus 10 includes a target recognition section 11, an operation state determination section 12, an activation timing calculation section 13, an activation determination section 14, and a control processing section 15.

The target recognition section 11 recognizes a target which is present around the own vehicle. The target recognition section 11 acquires detected information about the target from the radar apparatus 21 and the imaging apparatus 22. By using information about a position of the target acquired from the radar apparatus 21 and a characteristic point acquired from the imaging apparatus 22, the target recognition section 11 recognizes that the target is present at the position. For each target, the target recognition section 11 associates a relative position and a relative velocity of the target to the own vehicle. Based on the associated relative position and relative velocity, the target recognition section 11 calculates, for each target, a lateral velocity which is a relative velocity in a direction orthogonal to a traveling direction of the own vehicle and a longitudinal velocity which is a relative velocity in the traveling direction of the own vehicle.

The operation state determination section 12 determines whether a driver has started a collision avoidance operation for avoiding a collision between the own vehicle and the target recognized by the target recognition section 11. In the present embodiment, a condition for making the determination includes a determination condition regarding a steering operation, and based on a steering angle detected by the steering sensor 25, the operation state determination section 12 determines whether the driver has started the collision avoidance operation. In addition to the steering operation, the condition for determining whether the collision avoidance operation has been started can include a determination condition regarding an accelerator operation or a brake operation performed by the driver.

The activation timing calculation section 13 sets an activation timing of a safety apparatus as a support start timing for starting driving assistance for avoiding a collision between the own vehicle and the target recognized by the target recognition section 11 or reducing collision damage. In the present embodiment, the own vehicle includes a notification apparatus 31 and a brake apparatus 32 as the safety apparatus.

The notification apparatus 31 is, for example, an apparatus such as a loudspeaker or a display which is provided in an interior of the own vehicle. The notification apparatus 31 outputs a predetermined alarm sound, alarm message, or the like based on a control command from the driving assistance apparatus 10. By doing this, the notification apparatus 31 notifies the driver that there is a risk of collision (collision risk). The brake apparatus 32 performs braking of the own vehicle. In the present embodiment, in order to avoid a collision or reduce collision damage, the driving assistance apparatus 10 has a braking function as follows. Specifically, the driving assistance apparatus 10 has functions such as a brake assist function in which a braking force generated by a brake operation performed by the driver is increased so that the brake operation is assisted and an automatic braking function in which automatic braking is performed when no brake operation is performed by the driver. The brake apparatus 32 performs brake control by the above functions based on a control command from the driving assistance apparatus 10. As the safety apparatus, the driving assistance apparatus 10 can further include apparatuses such as a seat belt apparatus which retracts a seat belt provided in each seat of the own vehicle and a steering apparatus which performs automatic steering.

Figure 2:
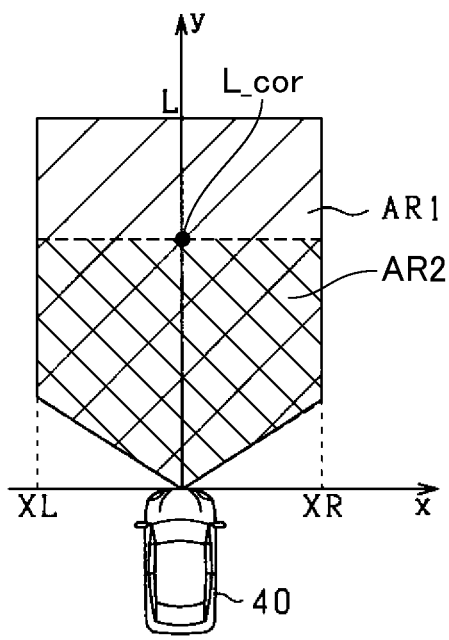
FIG. 2 is a view showing an activation region for a safety apparatus.

In the present embodiment, the activation timing calculation section 13 sets the activation timing of the safety apparatus according to the content of control for the driving assistance (hereinafter referred to as "driving assistance content"). Specifically, the driving assistance apparatus 10 has a function of performing, as the control for the driving assistance, first control for activating the notification apparatus 31, second control for assisting, by the brake assist function, a brake operation performed by the driver, and third control for performing automatic braking of the own vehicle by the automatic braking function. In this case, among these, the activation timing calculation section 13 sets the activation timing for the first control to be an earliest timing and sets the activation timing for the third control to be a latest timing. As shown in FIG. 2, the activation timing calculation section 13 calculates a depth L of an activation region AR1 for the safety apparatus based on the set activation timing and the relative velocity between the target and the own vehicle 40.

Based on the activation timing and time to collision (TTC) which is time until the own vehicle 40 collides with the target, the activation determination section 14 determines whether to activate the safety apparatus. Specifically, the activation determination section 14 sets a rightward regulation value XR and a leftward regulation value XL as regulation values in a lateral direction (x-axis direction in FIG. 2) for the target with respect to which the safety apparatus is to be activated. The activation region AR1 for the safety apparatus is a region which is defined by the rightward regulation value XR, the leftward regulation value XL, and the depth L. The activation region AR1 is set ahead of the own vehicle 40 in its traveling direction (y-axis direction in FIG. 2).

In the present embodiment, the rightward regulation value XR and the leftward regulation value XL of the activation region AR1 for the safety apparatus is predetermined according to a type of a target. For example, when the target is a preceding vehicle which is traveling ahead of the own vehicle 40 in its traveling direction, the target is less likely to suddenly move in the lateral direction. Accordingly, relatively small values are set as the rightward regulation value XR and the leftward regulation value XL. Meanwhile, when the target is a pedestrian who is crossing ahead of the own vehicle 40 in its traveling direction, the pedestrian may suddenly move in the lateral direction. Accordingly, relatively large values are set as the rightward regulation value XR and the leftward regulation value XL.

The activation determination section 14 calculates the time to collision by dividing a longitudinal distance (a relative distance in the traveling direction) between the target and the own vehicle 40 by the relative velocity. A method for calculating the time to collision is not limited to this. For example, in addition to the relative velocity, the activation determination section 14 can use relative acceleration to calculate the time to collision by assuming that the own vehicle 40 and the target approach each other in a uniformly accelerated linear motion. In the case where the activation determination section 14 determines that the time to collision has reached the activation timing (in the case where the target has entered the activation region AR1 for the safety apparatus), the activation determination section 14 outputs a signal indicating a result of the determination into the control processing section 15. When the result of the determination that the time to collision has reached the activation timing (the result of the determination that the target has entered the activation region AR1) is inputted from the activation determination section 14 into the control processing section 15, the control processing section 15 transmits a control command to the notification apparatus 31 or the brake apparatus 32. In the present embodiment, this allows the safety apparatus to be activated based on the control command and perform the control for the driving assistance such as issuance of alarm to the driver by the notification apparatus 31 or brake control by the brake apparatus 32.

In order to avoid a collision between the own vehicle 40 and a target which is present ahead of the own vehicle 40 in its traveling direction, the driver performs, for example, the collision avoidance operation such as the steering operation. If the safety apparatus is activated at this point, the driver may be annoyed by the activation of the safety apparatus. According to the driving assistance apparatus 10 of the present embodiment, therefore, in the case where the collision avoidance operation has been performed by the driver, the activation timing of the safety apparatus is delayed as compared to a case where the collision avoidance operation has not been performed. That is, in the present embodiment, in the case where the driver has demonstrated an intention to avoid a collision, the activation timing of the safety apparatus is delayed as compared to a case where the driver has not demonstrated any intention to avoid a collision.

According to the driving assistance apparatus 10 of the present embodiment, the activation timing of the safety apparatus is delayed as follows. Based on an instantaneous indicator (instantaneous parameter for steering) which is an instantaneous value of an indicator regarding steering of the own vehicle 40, the operation state determination section 12 determines whether the driver has started the collision avoidance operation for avoiding a collision between the target and the own vehicle 40. In the case where the operation state determination section 12 determines that the collision avoidance operation has not been started, the activation timing calculation section 13 sets the activation timing of the safety apparatus to be a predetermined reference timing TC1. The reference timing TC1 is set in advance according to the driving assistance content performed by the safety apparatus and is stored in a predetermined storage area of a memory or the like (storage apparatus) of the driving assistance apparatus 10.

Meanwhile, in the case where the operation state determination section 12 determines that the collision avoidance operation has been started, the activation timing calculation section 13 corrects the activation timing of the safety apparatus to a timing (hereinafter referred to as "delayed timing TC2") which is later than the reference timing TC1. More specifically, the activation timing calculation section 13 corrects the depth L of the activation region AR1 for the safety apparatus to a depth L_cor which is a distance to a position closer to the own vehicle 40. The activation timing calculation section 13 sets as the activation region (corrects the activation region) a region AR2 surrounded by the rightward regulation value XR, the leftward regulation value XL, and the depth L_cor obtained by the correction. Thus, in a situation where the driver has demonstrated an intention to avoid a collision, the safety apparatus is activated at a timing at which the own vehicle 40 is closer to the target (at a timing later than that in a situation where the driver has demonstrated no intention to avoid a collision).

In principle, the activation timing calculation section 13 sets the activation timing to be the delayed timing TC2 during a time period (hereinafter referred to as "collision avoidance time period") until a predetermined set time (hereinafter referred to as "first set time TA1") has elapsed from a time point (starting time point). Note that, the time point is a time at which the operation state determination section 12 determines that the collision avoidance operation has been started. Such a setting is maintained during the collision avoidance time period for the following reason. For example, assume that after the driver has started the collision avoidance operation, the collision avoidance operation is temporarily interrupted, and due to the temporary interruption, a process for delaying the activation timing is ended and the activation timing is returned to the reference timing TC1. In such a case, unnecessary activation (activation which is not necessary) of the safety apparatus may occur.

Meanwhile, assume that in a situation where a target is present ahead of the own vehicle 40 in its traveling direction, the driver performs a steering operation in which the steering wheel is only slightly moved leftwards or rightwards, and immediately after that, the steering wheel is returned to its original position. In such a case, it cannot necessarily be determined that the driver has an intention to avoid a collision. That is, it is a situation where the driver has not clearly demonstrated an intention to avoid a collision. Accordingly, in order to determine whether the driver has demonstrated an intention to avoid a collision, it is preferable to satisfy the following requirement. Specifically, it is preferable to have compatibility between responsiveness and robustness. The responsiveness means to enable determination that the driver has an intention to avoid a collision and produce a delay in the activation timing, immediately after the driver has started steering. The robustness means to prevent unnecessary delay in the activation timing, when the driver has performed steering by an amount too small to be the collision avoidance operation.

According to the driving assistance apparatus 10 of the present embodiment, therefore, the activation timing during the collision avoidance time period is set as follows. The activation timing calculation section 13 sets the activation timing based on a time-dependent indicator (time-dependent parameter for steering) which is related to steering of the own vehicle and is indicated by using the instantaneous indicator (a plurality of instantaneous parameters) at a plurality of timings during the collision avoidance time period. That is, in the present embodiment, the determination of whether the driver has started the collision avoidance operation is made by using the instantaneous indicator which is high in responsiveness after the steering has been started.

Meanwhile, the determination of whether to maintain or end the correction (correction for delay) of the activation timing is made by using the time-dependent indicator which is less likely to be influenced by noise or instantaneous steering.

Specifically, in the case where the operation state determination section 12 determines that the collision avoidance operation has been started, the activation timing calculation section 13 sets the activation timing to be the delayed timing TC2. Then, the activation timing calculation section 13 sets the activation timing during the collision avoidance time period based on the time-dependent indicator during a time period (hereinafter referred to as "avoidance initial time period") which is part of the collision avoidance time period and includes the starting time point of the collision avoidance time period. At this point, based on the time-dependent indicator, the activation timing calculation section 13 determines whether to maintain the setting of the activation timing at the delayed timing TC2 or end the setting of the activation timing at the delayed timing TC2 and change the activation timing to the reference timing TC1.

In the present embodiment, the avoidance initial time period is a time period until a predetermined set time (hereinafter referred to as "second set time TA2") has elapsed after the determination of the collision avoidance operation has been started. The activation timing calculation section 13 sets the activation timing to be the delayed timing TC2 until the avoidance initial time period has elapsed. At a time point at which the avoidance initial time period has elapsed, the activation timing calculation section 13 makes a comparison between the time-dependent indicator during the avoidance initial time period and a threshold B. Based on a comparison result, the activation timing calculation section 13 determines whether to maintain or change the setting of the activation timing.

Figure 3:
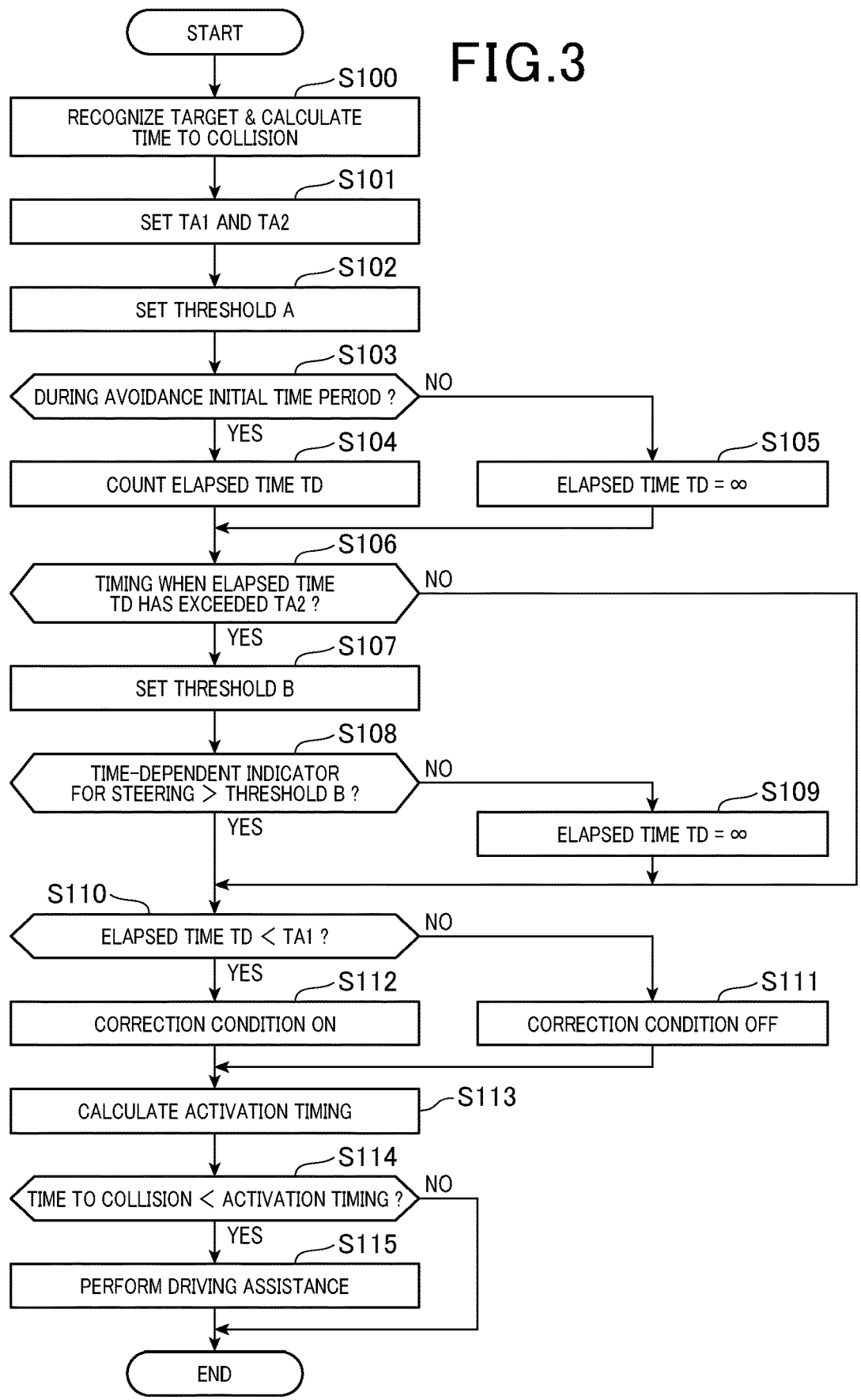
FIG. 3 is a flowchart showing a procedure for driving assistance control of a first embodiment.

The following will describe, with reference to a flowchart in FIG. 3, a procedure for driving assistance control performed by the driving assistance apparatus 10 of the present embodiment. This process is performed according to a predetermined control cycle and performed with respect to each target which is present ahead of the own vehicle 40 in its traveling direction.

As shown in FIG. 3, the driving assistance apparatus 10 recognizes a target by using detected information about the target provided from the radar apparatus 21 and detected information about the target provided from the imaging apparatus 22 (step S100). The driving assistance apparatus 10 calculates the time to collision for each target thus recognized. The driving assistance apparatus 10 sets the first set time TA1 and the second set time TA2 according to the own vehicle speed and the driving assistance content (step S101). The first set time TA1 defines the collision avoidance time period, and the second set time TA2 defines the avoidance initial time period. The second set time TA2 is set to be shorter than the first set time TA1.

As the own vehicle speed is faster, a steering operation for avoiding a collision performed by the driver is smaller. In the present embodiment, in consideration of this point, the first set time TA1 and the second set time TA2 are set to be shorter as the own vehicle speed is faster. Unnecessary activation of the automatic braking function (third control), which is one of the driving assistance contents performed by the safety apparatus, is unacceptable as compared to, for example, the other functions (first and second control) such as the alarm function and the brake assist function. That is, an acceptable extent of unnecessary activation varies depending on the driving assistance content. In the present embodiment, in consideration of this point, the first set time TA1 and the second set time TA2 are set to be shortest for the alarm function and longest for the automatic braking function. According to the driving assistance apparatus 10 of the present embodiment, data (e.g., mapping data, or the like) in which the aforementioned correspondence relationship between the own vehicle speed and the driving assistance content, and the set time is set in advance is stored in the predetermined storage area of the memory or the like. The driving assistance apparatus 10 uses the data to set each of the first set time TA1 and the second set time TA2.

The driving assistance apparatus 10 sets a threshold A for determining whether the driver has started the collision avoidance operation (step S102). The driving assistance apparatus 10 determines whether it is during the avoidance initial time period (step S103). At this point, the driving assistance apparatus 10 compares the instantaneous indicator for steering to the threshold A (instantaneous indicator condition) and determines whether elapsed time after the instantaneous indicator has exceeded the threshold A is within the first set time TA1. In the present embodiment, the instantaneous indicator for steering is an instantaneous value of a steering angular velocity which is a time derivative value of the steering angle. Thus, in the process at step S103, the driving assistance apparatus 10 determines whether it is a timing at which the instantaneous value of the steering angular velocity has exceeded the threshold A and whether elapsed time after the instantaneous value of the steering angular velocity has exceeded the threshold A is within the first set time TA1. In the case where the instantaneous value of the steering angular velocity has exceeded the threshold A, the instantaneous indicator condition is set to ON. Meanwhile, in the case where the instantaneous value of the steering angular velocity has not exceeded the threshold A, the instantaneous indicator condition is set to OFF.

In the present embodiment, the threshold A is set according to the own vehicle speed and the driving assistance content. Specifically, in consideration of the fact that the steering operation for avoiding a collision performed by the driver is smaller as the own vehicle speed is faster, the threshold A is set to be a lower value as the own vehicle speed is faster. With regard to the driving assistance content performed by the safety apparatus, the threshold A is set to be a higher value for the alarm function and a lower value for the automatic braking function. A reason for the setting is as follows. The automatic braking function greatly intervenes in driving performed by the driver, and thus unnecessary activation of the automatic braking function is unacceptable. Accordingly, by setting the activation timing to be late, the unnecessary activation is effectively suppressed. According to the driving assistance apparatus 10 of the present embodiment, data (e.g., mapping data, or the like) in which the aforementioned correspondence relationship between the own vehicle speed and the driving assistance content, and the threshold A is set in advance is stored in the predetermined storage area of the memory or the like. The driving assistance apparatus 10 uses the data to set the threshold A.

In the case where the driving assistance apparatus 10 determines that it is during the avoidance initial time period (YES at step S103), the driving assistance apparatus 10 counts elapsed time TD after it is determined that the driver has started the collision avoidance operation (step S104). At this point, the driving assistance apparatus 10 starts counting the elapsed time TD at a timing at which the instantaneous value of the steering angular velocity (instantaneous indicator for steering) has exceeded the threshold A. After the counting of the elapsed time TD is started, the counting is continued. Meanwhile, in the case where the driving assistance apparatus 10 determines that it is not during the avoidance initial time period (the avoidance initial time period has already elapsed) (NO at step S103), the driving assistance apparatus 10 sets the elapsed time TD to be infinite (∞) (step S105).

The driving assistance apparatus 10 determines whether it is a timing at which the elapsed time TD has exceeded the second set time TA2 (step S106). In the case where the driving assistance apparatus 10 determines that it is the timing at which the elapsed time TD has exceeded the second set time TA2 (YES at step S106), the driving assistance apparatus 10 sets the threshold B for determining whether to maintain or change the setting of the activation timing (step S107). The driving assistance apparatus 10 compares the time-dependent indicator for steering to the threshold B (time-dependent indicator condition) and determines whether the time-dependent indicator has exceeded the threshold B (step S108). In the present embodiment, the time-dependent indicator for steering is an integrated value Σ of the steering angular velocity (amount of change in steering angle). Thus, in the process at step S108, the driving assistance apparatus 10 determines whether the integrated value Σ of the steering angular velocity during the avoidance initial time period has exceeded the threshold B. In the case where, at the timing at which the elapsed time TD has exceeded the second set time TA2, the integrated value Σ has exceeded the threshold B, the time-dependent indicator condition is set to ON. Meanwhile, in the case where the integrated value Σ has not exceeded the threshold B, the time-dependent indicator condition is set to OFF.

In the present embodiment, the threshold B is set according to the own vehicle speed and the driving assistance content. Also, in the case of the threshold B, as with the threshold A, in consideration of the fact that the steering operation for avoiding a collision performed by the driver is smaller as the own vehicle speed is faster, the threshold B is set to be a lower value as the own vehicle speed is faster. Furthermore, in consideration of the fact that unnecessary activation of the automatic braking function is unacceptable, the threshold B is set to be a higher value for the alarm function and a lower value for the automatic braking function. According to the driving assistance apparatus 10 of the present embodiment, data (e.g., mapping data, or the like) in which the aforementioned correspondence relationship between the own vehicle speed and the driving assistance content, and the threshold B is set in advance is stored in the predetermined storage area of the memory or the like. The driving assistance apparatus 10 uses the data to set the threshold B.

In the case where the driving assistance apparatus 10 determines that the integrated value Σ of the steering angular velocity (time-dependent indicator for steering) has not exceeded the threshold B (NO at step S108), the driving assistance apparatus 10 sets the elapsed time TD to be infinite (∞) (step S109). Meanwhile, in the case where the driving assistance apparatus 10 determines that the integrated value Σ of the steering angular velocity has exceeded the threshold B (YES at step S108), the elapsed time TD is maintained, and control proceeds to a process at step S110. Also, in the case where the driving assistance apparatus 10 determines in the process at step S106 that it is not the timing at which the elapsed time TD has exceeded the second set time TA2 (NO at step S106), control proceeds to the process at step S110 while the elapsed time TD is maintained.

The driving assistance apparatus 10 determines whether the elapsed time TD is shorter than the first set time TA1 (whether the elapsed time TD has exceeded the first set time TA1) (step S110). In the case where the driving assistance apparatus 10 determines that the elapsed time TD is shorter than the first set time TA1 (in the case where the elapsed time TD has not exceeded the first set time TA1; YES at step S110), the driving assistance apparatus 10 sets a correction condition for the activation timing to ON (step S112). Meanwhile, in the case where the driving assistance apparatus 10 determines that the elapsed time TD is not less than the first set time TA1 (in the case where the elapsed time TD has exceeded the first set time TA1; NO at step S110), the driving assistance apparatus 10 sets the correction condition for the activation timing to OFF (step S111).

The driving assistance apparatus 10 calculates the activation timing of the safety apparatus (step S113). At this point, when the correction condition is OFF, the driving assistance apparatus 10 calculates the activation timing by reading, according to a type of the safety apparatus, the reference timing TC1 which is stored in advance in the predetermined storage area of the memory or the like of the driving assistance apparatus 10. When the correction condition is ON, the driving assistance apparatus 10 calculates the activation timing by correcting the read reference timing TC1 so that the reference timing TC1 is delayed to the delayed timing TC2.

The driving assistance apparatus 10 compares the time to collision to the activation timing and determines whether the time to collision is shorter than the activation timing (whether the time to collision has reached the activation timing) (step S114). In the case where the driving assistance apparatus 10 determines that the time to collision is not more than the activation timing (in the case where the time to collision has reached the activation timing; YES at step S114), the driving assistance apparatus 10 transmits a control command (drive signal) to the safety apparatus to be activated and performs the driving assistance (step S115). Then, a series of control processes ends. Meanwhile, in the case where the driving assistance apparatus 10 determines that the time to collision is longer than the activation timing (in the case where the time to collision has not reached the activation timing; NO at step S114), the driving assistance apparatus 10 performs no driving assistance, and the series of control processes ends.

Figure 4:
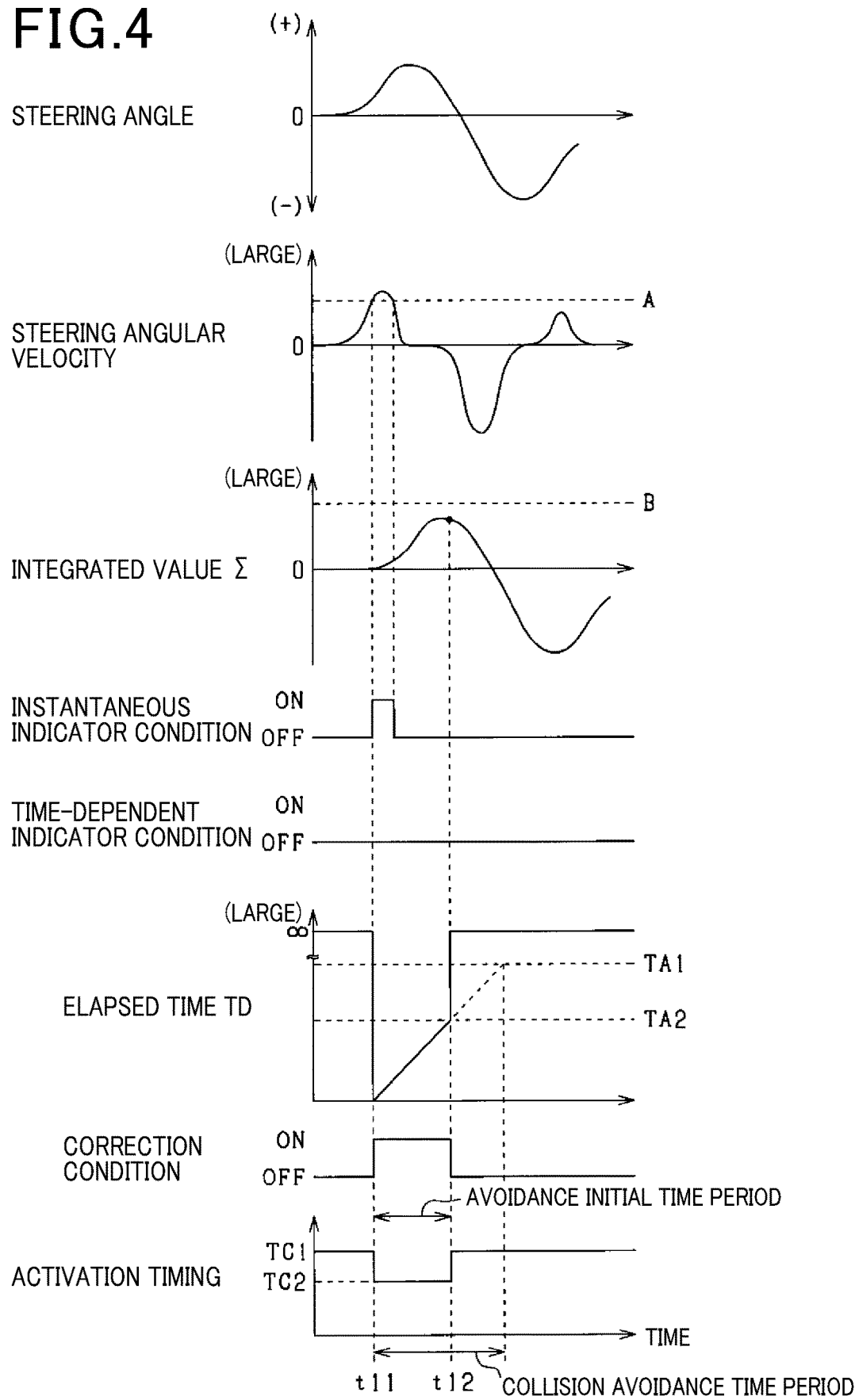
FIG. 4 is a time chart showing a specific condition of the driving assistance control of the first embodiment.
Figure 5:
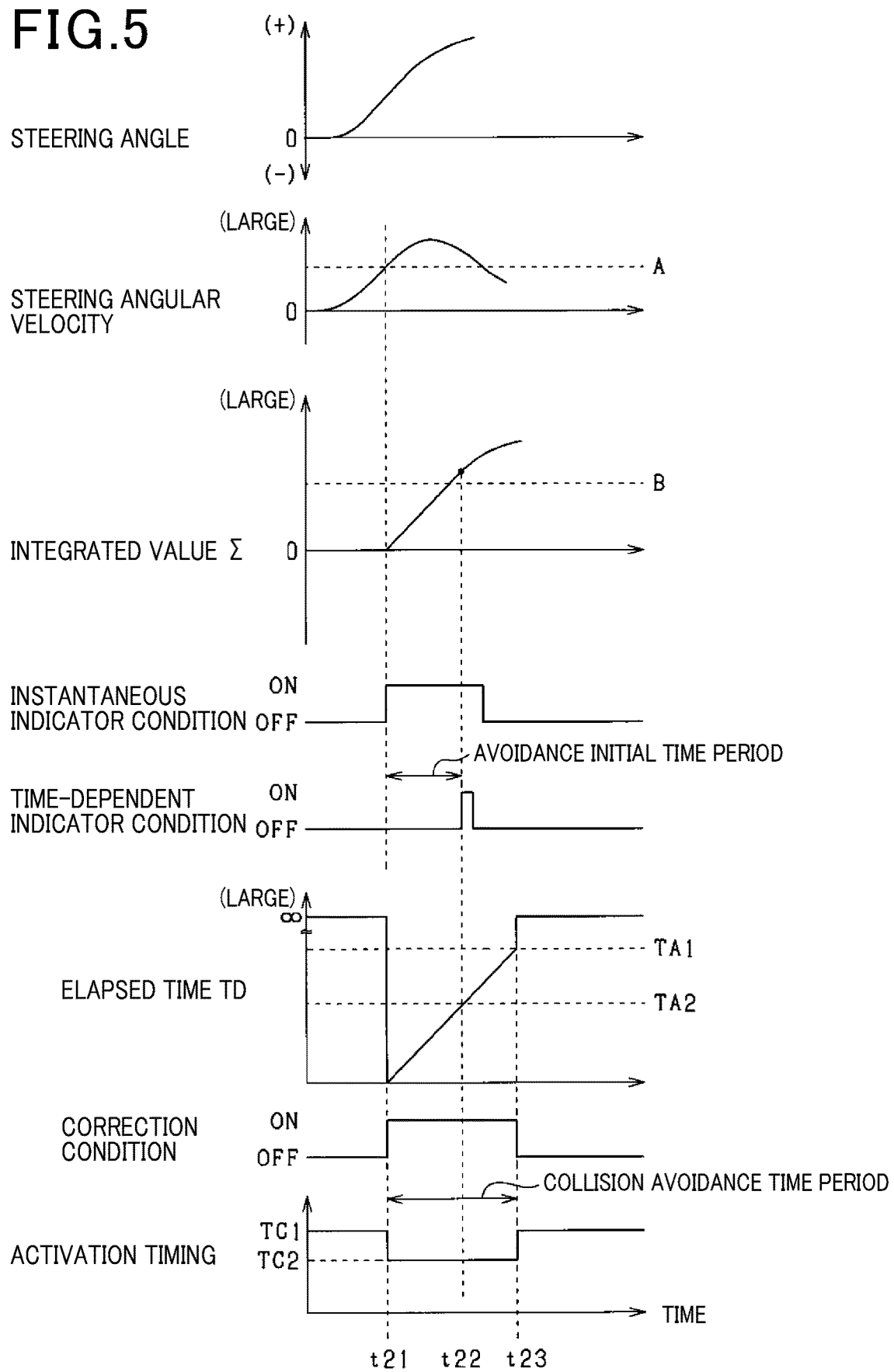
FIG. 5 is a time chart showing a specific condition of the driving assistance control of the first embodiment.

The following will describe, with reference to time charts shown in FIGS. 4 and 5, the activation timing of the safety apparatus when the process for the driving assistance control shown in FIG. 3 is performed. FIG. 4 shows a case where the driver has only slightly moved the steering wheel leftwards or rightwards, and immediately after that, the driver has turned the steering wheel in an opposite direction. FIG. 5 shows a case where the driver has moved the steering wheel with an intention to avoid a collision. FIGS. 4 and 5 show various types of transition information below. Specifically, FIGS. 4 and 5 show transition in each of the "steering angle detected by the steering sensor 25," "steering angular velocity," "integrated value Σ of the steering angular velocity," "ON/OFF of the instantaneous indicator condition," "ON/OFF of the time-dependent indicator condition," "elapsed time TD," "ON/OFF of the correction condition for the activation timing," and "activation timing." FIGS. 4 and 5 assume a case where a target has been detected ahead of the own vehicle 40 in its traveling direction.

Assume that, as shown in the steering angle in FIG. 4, the steering angular velocity (instantaneous indicator for steering) has exceeded the threshold A when the driver has turned the steering wheel leftwards or rightwards. In such a case, at time t11 when the steering angular velocity has exceeded the threshold A, the instantaneous indicator condition is set to ON and the correction condition is set to ON. Accordingly, the activation timing is corrected from the reference timing TC1 to the delayed timing TC2.

After the time t11, when the driver has turned the steering wheel in an opposite direction during the collision avoidance time period before the first set time TA1 has elapsed from the time t11, the integrated value Σ of the steering angular velocity changes from increasing to decreasing. When the second set time TA2 (avoidance initial time period) has elapsed from the time t11, at time t12, the integrated value Σ of the steering angular velocity (time-dependent indicator for steering) is compared to the threshold B. At this point, the integrated value Σ of the steering angular velocity has not exceeded the threshold B. Thus, the time-dependent indicator condition is maintained to be OFF and the correction condition is switched from ON to OFF. Accordingly, the activation timing is changed from the delayed timing TC2 to the reference timing TC1.

In FIG. 5, as with in FIG. 4, when the steering angular velocity has exceeded the threshold A due to an operation of the steering wheel performed by the driver, at time t21 when the steering angular velocity has exceeded the threshold A, the instantaneous indicator condition is set to ON and the correction condition is set to ON. Accordingly, the activation timing is corrected from the reference timing TC1 to the delayed timing TC2. After that, at time t22 when the second set time TA2 (avoidance initial time period) has elapsed from the time t21, the integrated value Σ of the steering angular velocity is compared to the threshold B. At this point, the integrated value Σ of the steering angular velocity has exceeded the threshold B. Thus, the time-dependent indicator condition is switched from OFF to ON and the correction condition is maintained to be ON. Accordingly, the activation timing is maintained to be the delayed timing TC2. At time t23 when the first set time TA1 (collision avoidance time period) has elapsed from the time t21, the correction condition is switched from ON to OFF and the activation timing is returned to the reference timing TC1.

The driving assistance apparatus 10 of the present embodiment described above in detail yields the following beneficial effects.

The driving assistance apparatus 10 of the present embodiment determines, based on the instantaneous indicator for steering, whether the driver has started the collision avoidance operation for avoiding a collision between the target and the own vehicle 40. The driving assistance apparatus 10 is configured such that in the case where it is determined that the collision avoidance operation has been started, the activation timing of the safety apparatus during the collision avoidance time period is set based on the time-dependent indicator for steering. The above configuration allows the driving assistance apparatus 10 to have responsiveness which, when the driver has demonstrated an intention to avoid a collision, enables immediate determination that the driver has the intention to avoid a collision. Furthermore, the driving assistance apparatus 10 is capable of suppressing delay in the activation timing due to steering which is not the collision avoidance operation. This allows the driving assistance apparatus 10 of the present embodiment to start, at an appropriate timing, the driving assistance for avoiding a collision or reducing collision damage.

The driving assistance apparatus 10 of the present embodiment is configured such that the activation timing of the safety apparatus is set to be the reference timing TC1 or the delayed timing TC2 based on the time-dependent indicator for steering during the time period including the start of the collision avoidance time period. The above configuration allows the driving assistance apparatus 10 to make the determination by using the time-dependent indicator during the avoidance initial time period which is part of the collision avoidance time period and includes the starting time point of the collision avoidance time period. This allows the driving assistance apparatus 10 of the present embodiment to determine as early as possible whether the driver has demonstrated an intention to avoid a collision.

In particular, in the present embodiment, the activation timing is set to be the delayed timing TC2 until the second set time TA2 has elapsed after it is determined that the collision avoidance operation has been started. At the timing at which the second set time TA2 has elapsed, the time-dependent indicator for steering during the time period (avoidance initial time period) until the second set time TA2 has elapsed after it is determined that the collision avoidance operation has been started is compared to the threshold B. Then, in the case where the time-dependent indicator has exceeded the threshold B, the activation timing is maintained to be the delayed timing TC2. Meanwhile, in the case where the time-dependent indicator has not exceeded the threshold B, the activation timing is changed from the delayed timing TC2 to the reference timing TC1. The above configuration allows the driving assistance apparatus 10 to determine whether the driver has demonstrated an intention to avoid a collision, after the instantaneous indicator for steering is sufficiently accumulated. Accordingly, the present embodiment is suitable in terms of improvement in accuracy in determining an intention to avoid a collision.

The acceptable extent of unnecessary activation varies depending on the driving assistance content. Focusing on this point, the driving assistance apparatus 10 of the present embodiment is configured such that the first set time TA1, the second set time TA2, the threshold A, and the threshold B are set to be variable depending on the driving assistance content performed by the safety apparatus. Specifically, the driving assistance apparatus 10 is configured such that the settings of the first set time TA1, the second set time TA2, the threshold A, and the threshold B are variable for each of the first control for the alarm function, the second control for the brake assist function, and the third control for the automatic braking function. The above configuration allows the driving assistance apparatus 10 to start activation of the safety apparatus at an appropriate timing for each driving assistance content.

An operation amount or an operation speed of the steering operation for avoiding a collision performed by the driver varies depending on the own vehicle speed. Focusing on this point, the driving assistance apparatus 10 of the present embodiment is configured such that the first set time TA1, the second set time TA2, the threshold A, and the threshold B are set to be variable depending on the own vehicle speed. The above configuration allows the driving assistance apparatus 10 to start activation of the safety apparatus at an appropriate timing according to the own vehicle speed.

(Second Embodiment)

The driving assistance apparatus of the present embodiment has a common general configuration with the first embodiment. In the present embodiment, instead of the configuration in which the avoidance initial time period is set in advance to have a predetermined length, the avoidance initial time period is set to be longer as time elapses. In the present embodiment, the time-dependent indicator for steering during the avoidance initial time period is sequentially compared to a threshold and the activation timing is set. The present embodiment differs from the first embodiment in this point. In the following description, common components are given the same reference numerals, and descriptions of such components are omitted.

Specifically, the activation timing calculation section 13 sets the activation timing during the collision avoidance time period to be the reference timing TC1 or the delayed timing TC2 based on the time-dependent indicator for steering during the avoidance initial time period which is part of the collision avoidance time period and includes the starting time point of the collision avoidance time period. The present embodiment is the same as the first embodiment in this point. According to the above configuration of the present embodiment, the time-dependent indicator for steering during a time period from the start of the collision avoidance time period to a current time point (elapsed time from the start) is sequentially compared to a threshold C. Then, in the case where the time-dependent indicator has exceeded the threshold C, the activation timing is maintained to be the delayed timing TC2. Meanwhile, in the case where the time-dependent indicator has not exceeded the threshold C, the activation timing is changed from the delayed timing TC2 to the reference timing TC1. The threshold C is set to be variable depending on the elapsed time from the start of the collision avoidance operation. That is, the driving assistance apparatus 10 of the present embodiment sequentially monitors the integrated value Σ of the steering angular velocity (amount of change in steering angle) which is the time-dependent indicator for steering during the collision avoidance time period. In the case where the integrated value Σ has not exceeded the threshold C, the driving assistance apparatus 10 ends the correction for delaying the activation timing so that the activation timing is returned to the reference timing TC1.

Figure 6:
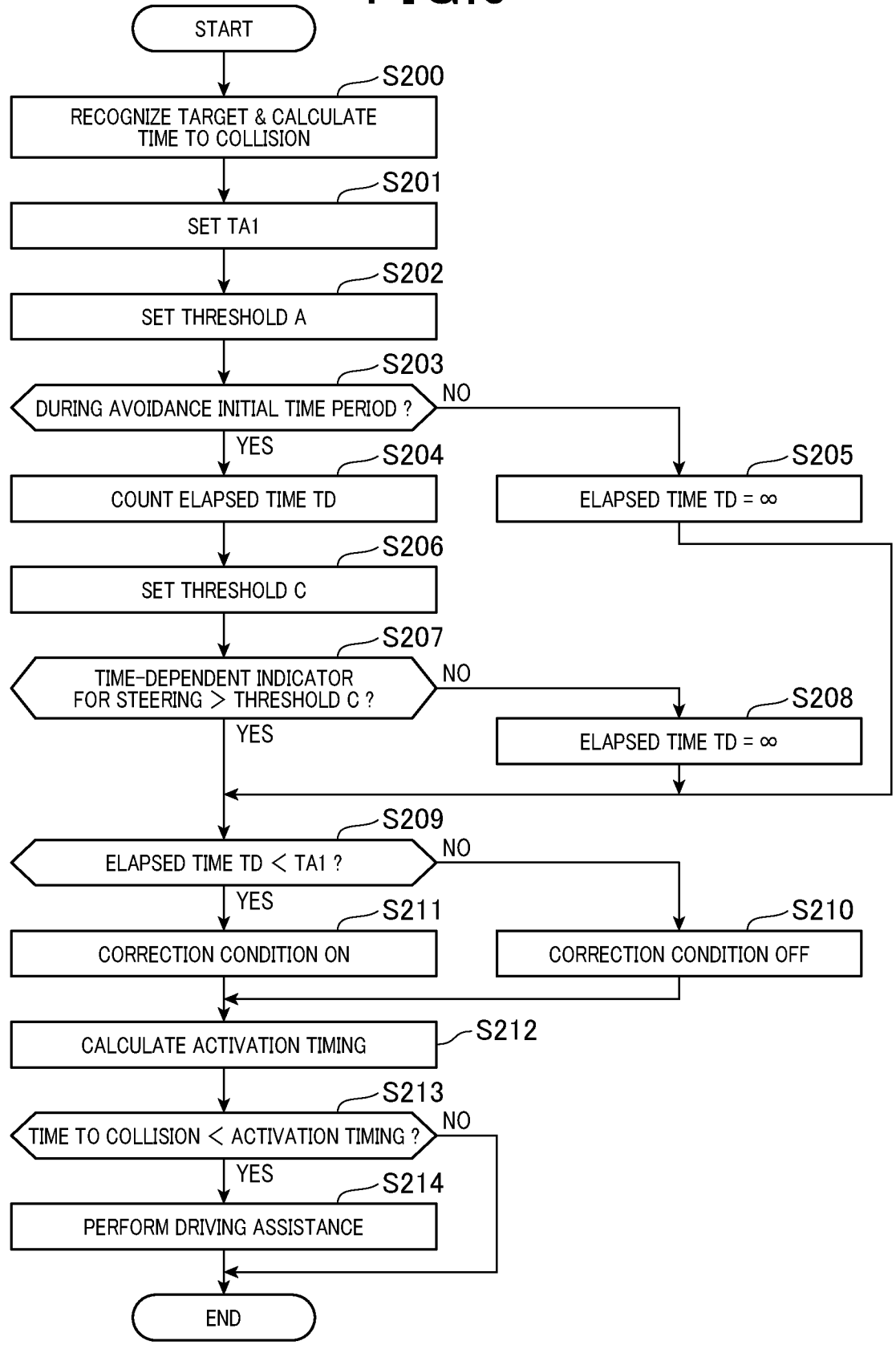
FIG. 6 is a flowchart showing a procedure for driving assistance control of a second embodiment.

The following will describe, with reference to a flowchart in FIG. 6, a procedure for driving assistance control performed by the driving assistance apparatus 10 of the present embodiment. This process is performed according to a predetermined control cycle and performed with respect to each target which is present ahead of the own vehicle 40 in its traveling direction. In the description of FIG. 6, the same processes as those in FIG. 3 are given the same step numbers, and descriptions of such processes are omitted.

As shown in FIG. 6, the driving assistance apparatus 10 performs the same process as that at step S100 in FIG. 3 to recognize a target and calculate the time to collision (step S200). The driving assistance apparatus 10 sets the first set time TA1 according to the own vehicle speed and the driving assistance content (step S201). The driving assistance apparatus 10 performs the same process as that at step S102 in FIG. 3 to set the threshold A according to the own vehicle speed and the driving assistance content (step S202). The driving assistance apparatus 10 performs the same processes as those at steps S103 to S105 in FIG. 3 to determine whether it is during the avoidance initial time period and set the elapsed time TD based on a result of the determination (step S203 to S205). Specifically, in the case where the driving assistance apparatus 10 determines that it is during the avoidance initial time period, the driving assistance apparatus 10 counts the elapsed time TD. Meanwhile, in the case where the driving assistance apparatus 10 determines that it is not during the avoidance initial time period, the driving assistance apparatus 10 sets the elapsed time TD to be infinite. After the driving assistance apparatus 10 sets the elapsed time TD to be infinite, control proceeds to a process at step S209.

The driving assistance apparatus 10 sets, according to the elapsed time TD, the threshold C for determining whether to maintain or change the setting of the activation timing (step S206).

Figure 7:
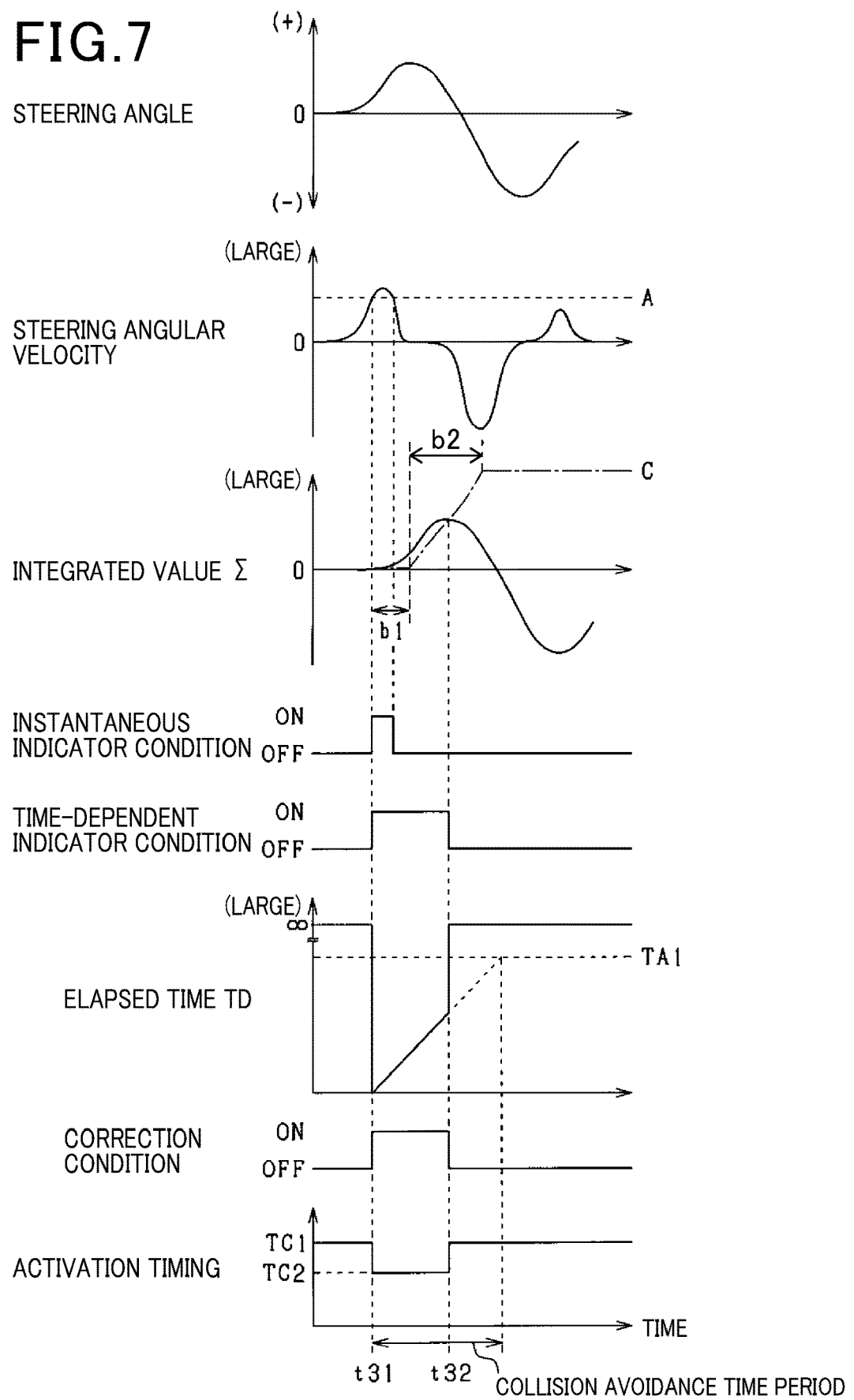
FIG. 7 is a time chart showing a specific condition of the driving assistance control of the second embodiment.

Specifically, the threshold C is set as follows. For example, as shown in FIG. 7, in the present embodiment, the threshold C is set to be zero during a time period b1 until a predetermined time has elapsed from the start of the collision avoidance time period. During a predetermined time period b2 after the time period b1, the threshold C is set to be a larger value as the elapsed time TD increases. After time (b1+b2) has elapsed from the start of the collision avoidance time period, the threshold C is set to be a constant value (upper limit value).

As with the threshold B of the first embodiment, the threshold C is set according to the own vehicle speed and the driving assistance content. Specifically, the threshold C is set to be a lower value as the own vehicle speed is faster. In consideration of the fact that the acceptable extent of unnecessary activation varies depending on the driving assistance content, the threshold C is set to be a higher value for the alarm function and a lower value for the automatic braking function.

The driving assistance apparatus 10 compares the integrated value Σ of the steering angular velocity which is the time-dependent indicator for steering to the threshold C (time-dependent indicator condition) and determines whether the time-dependent indicator has exceeded the threshold C (step S207). In the case where the driving assistance apparatus 10 determines that the integrated value Σ of the steering angular velocity (time-dependent indicator for steering) has exceeded the threshold C (YES at step S207), the elapsed time TD is maintained, and control proceeds to the process at step S209. Meanwhile, in the case where the driving assistance apparatus 10 determines that the integrated value Σ of the steering angular velocity has not exceeded the threshold C (NO at step S207), the driving assistance apparatus 10 sets the elapsed time TD to be infinite (step S208), and control proceeds to the process at step S209. In the present embodiment, in the case where the integrated value Σ has exceeded the threshold C, the time-dependent indicator condition is set to ON. Meanwhile, in the case where the integrated value Σ has not exceeded the threshold C, the instantaneous indicator condition is set to OFF. The driving assistance apparatus 10 performs the same processes as those at steps S110 to S115 in FIG. 3 (steps S209 to S214) to correct the activation timing and perform the driving assistance, and a series of processes ends.

The following will describe, with reference to a time chart shown in FIG. 7, the activation timing of the safety apparatus when the process for the driving assistance control shown in FIG. 6 is performed. FIG. 7 shows a case where the driver has only slightly moved the steering wheel leftwards or rightwards, and immediately after that, the driver has turned the steering wheel in an opposite direction. Various types of transition information shown in FIG. 7 is the same as that shown in FIG. 4. As with FIG. 4, FIG. 7 assumes a case where a target has been detected ahead of the own vehicle 40 in its traveling direction.

Assume that, as shown in the steering angle in FIG. 7, the steering angular velocity (instantaneous indicator for steering) has exceeded the threshold A when the driver has turned the steering wheel leftwards or rightwards. In such a case, at time t31 when the steering angular velocity has exceeded the threshold A, the instantaneous indicator condition is set to ON and the correction condition is set to ON. Accordingly, the activation timing is corrected from the reference timing TC1 to the delayed timing TC2. For some time after the driver has performed the steering operation, the integrated value Σ of the steering angular velocity is maintained to be greater than the threshold C. While the integrated value Σ of the steering angular velocity is greater than the threshold C (integrated value Σ>threshold C), the time-dependent indicator condition is set to ON and the correction condition is maintained to be ON. After that, at time t32 when the integrated value Σ becomes smaller than the threshold C, the time-dependent indicator condition is set to OFF and the correction condition is set to OFF. Accordingly, the activation timing is changed from the delayed timing TC2 to the reference timing TC1.

The driving assistance apparatus 10 sets the activation timing during the collision avoidance time period to be the reference timing TC1 or the delayed timing TC2 based on the time-dependent indicator for steering during the avoidance initial time period. According to the above configuration of the present embodiment, the time-dependent indicator for steering during a time period from the start of the collision avoidance time period to a current time point (elapsed time from the start) is sequentially compared to a threshold C. Then, in the case where the time-dependent indicator has exceeded the threshold C, the activation timing is maintained to be the delayed timing TC2. Meanwhile, in the case where the time-dependent indicator has not exceeded the threshold C, the activation timing is changed from the delayed timing TC2 to the reference timing TC1. The above configuration allows the driving assistance apparatus 10 to promptly determine that the driver has demonstrated no intention to avoid a collision, at a time point at which the driver's behavior occurs. This allows the driving assistance apparatus 10 of the present embodiment to return the activation timing early from the delayed timing TC2 to the reference timing TC1, when the driver has demonstrated no intention to avoid a collision.

(Other Embodiments)

The technique of the present disclosure is not limited to the aforementioned embodiments and can be implemented, for example, as described below.

In the aforementioned embodiments, the instantaneous indicator for steering is the instantaneous value of the steering angular velocity. However, the instantaneous indicator is not limited to this, provided that the instantaneous indicator is an instantaneous value of an indicator regarding steering of the own vehicle 40. As the instantaneous indicator for steering, for example, a value such as an instantaneous value of the steering angle or an instantaneous value of the yaw rate can be used. Furthermore, the determination process based on the instantaneous indicator for steering can be performed by using, as the instantaneous indicator, two or more of the instantaneous value of the steering angular velocity, the instantaneous value of the steering angle, and the instantaneous value of the yaw rate. As the instantaneous indicator for steering, the instantaneous value of the steering angle and the instantaneous value of the steering angular velocity are more suitable than other instantaneous values in that a driver's intention to avoid a collision is directly reflected.

In the aforementioned embodiments, the time-dependent indicator for steering is the amount of change in steering angle indicated by the integrated value Σ of the steering angular velocity, but the time-dependent indicator is not limited to this. As the time-dependent indicator for steering, for example, a value such as an average value of the steering angle, an average value of the steering angular velocity, or an average value of the yaw rate during a predetermined time can be used. Furthermore, the determination process based on the time-dependent indicator for steering can be performed by using two or more of these values as the time-dependent indicator. As the time-dependent indicator for steering, the average value of the steering angle and the average value of the steering angular velocity during a predetermined time from the start of the collision avoidance time period are more suitable than other average values in that a driver's intention to avoid a collision is directly reflected.

In the aforementioned embodiments, the time-dependent indicator for steering to be compared to the threshold is the time-dependent indicator during the avoidance initial time period, but the time-dependent indicator is not limited to this. The time-dependent indicator to be compared to the threshold only needs to be a time-dependent indicator during a time period including part of the collision avoidance time period. Specifically, for example, the time-dependent indicator can be an amount of change in indicator regarding steering or an average value of an indicator regarding steering during a time period starting from a time point at which the indicator regarding steering has started to change. Alternatively, the time-dependent indicator to be compared to the threshold can be an amount of change in indicator regarding steering or an average value of an indicator regarding steering during a time period which is part of the collision avoidance time period and does not include the start or end of the collision avoidance time period.

In the aforementioned embodiments, the threshold A, the threshold B, and the threshold C are set to be variable depending on the own vehicle speed and the driving assistance content, but the thresholds are not limited to this. At least one value of the threshold A, the threshold B, and the threshold C can be a constant value which is not variable. The same applies to the first set time TA1 and the second set time TA2. At least one value of the first set time TA1 and the second set time TA can be a constant value.

The aforementioned embodiments have described a case of avoiding a collision with an obstacle which is present ahead of the own vehicle when the vehicle is traveling forward. However, the present disclosure is not limited to this. For example, the present disclosure is applicable to a system in which, when the vehicle is traveling backward, an obstacle which is present behind the vehicle is detected, and a collision between the vehicle and the obstacle is avoided. Note that the phrase "ahead of the vehicle" means a forward direction of the vehicle when the vehicle is traveling forward. Meanwhile, the phrase means a backward direction of the vehicle when the vehicle is traveling backward.

The above components are conceptional and are not limited to the aforementioned embodiments. For example, it is possible to achieve functions of a single component by distributing the functions among a plurality of components or achieve functions of a plurality of components by a single component.

REFERENCE SIGNS LIST

10 . . . Driving assistance apparatus
11 . . . Target recognition section
12 . . . Operation state determination section
13 . . . Activation timing calculation section
14 . . . Activation determination section
15 . . . Control processing section
21 . . . Radar apparatus
22 . . . Imaging apparatus
31 . . . Notification apparatus
32 . . . Brake apparatus
40 . . . Own vehicle

The invention claimed is:

1. A driving assistance apparatus comprising:
a target recognition section which recognizes a target which is present around an own vehicle;
an operation determination section which determines, by using an instantaneous indicator which is an instantaneous value of a parameter regarding steering of the own vehicle, whether a driver has started a collision avoidance operation for avoiding a collision between the own vehicle and the target recognized by the target recognition section;
a timing calculation section which, in a case where the operation determination section determines that the collision avoidance operation has been started, sets a support start timing to be a late timing which is later than the support start timing for a case where the collision avoidance operation has not been started, the support start timing being a timing at which driving assistance for avoiding a collision between the own vehicle and the target or reducing collision damage is started; and
a control section which starts the driving assistance based on the support start timing set by the timing calculation section, wherein:
a length of an avoidance initial time period is predetermined, the avoidance initial time period being part of a collision avoidance time period and including a starting time point of the collision avoidance time period, the collision avoidance time period being a time period until a predetermined set time has elapsed after the operation determination section determines that the collision avoidance operation has been started;
until the avoidance initial time period has elapsed, the timing calculation section sets the support start timing during the collision avoidance time period to be the late timing; and
after the avoidance initial time period has elapsed, the timing calculation section makes a comparison between a time-dependent indicator for steering during the avoidance initial time period and a threshold, and based on the comparison, the timing calculation section maintains the support start timing during the collision avoidance time period to be the late timing or changes the support start timing during the collision avoidance time period to be the support start timing for the case where the collision avoidance operation has not been started, the time-dependent indicator which being indicated by using the instantaneous indicator at a plurality of timings during the collision avoidance time period.

2. The driving assistance apparatus according to claim 1, wherein:
the driving assistance apparatus has a function of performing, as the driving assistance, first control for activating an alarm apparatus which is mounted on the own vehicle, second control for assisting, by a braking apparatus of the own vehicle, a brake operation which is performed by the driver, and third control for performing automatic braking of the own vehicle by the braking apparatus; and
at least one of the length of the avoidance initial time period and the threshold is set to be variable for each control for the driving assistance.

3. The driving assistance apparatus according to claim 1, wherein at least one of the length of the avoidance initial time period and the threshold is set to be variable depending on a vehicle speed of the own vehicle.

4. The driving assistance apparatus according to claim 1, wherein:
the avoidance initial time period becomes longer as time elapses; and
the timing calculation section sequentially makes a comparison between the time-dependent indicator during the avoidance initial time period and a threshold, and based on a comparison result, the timing calculation section maintains the support start timing during the collision avoidance time period to be the late timing or changes the support start timing during the collision avoidance time period to be the support start timing for the case where the collision avoidance operation has not been started.

5. The driving assistance apparatus according to claim 4, wherein:
the driving assistance apparatus has a function of performing, as the driving assistance, first control for activating an alarm apparatus which is mounted on the own vehicle, second control for assisting, by a braking apparatus of the own vehicle, a brake operation which is performed by the driver, and third control for performing automatic braking of the own vehicle by the braking apparatus; and the threshold is set to be variable for each control for the driving assistance.

6. The driving assistance apparatus according to claim 4, wherein the threshold is set to be variable depending on a vehicle speed of the own vehicle.

7. The driving assistance apparatus according to claim 1, wherein the time-dependent indicator is at least one of an amount of change in steering angle, an average value of a steering angle, and an average value of a steering angular velocity during a predetermined time from start of the collision avoidance time period.

8. The driving assistance apparatus according to claim 1, wherein the instantaneous indicator is at least one of an instantaneous value of a steering angle and an instantaneous value of a steering angular velocity.

9. A driving assistance method performed by a driving assistance apparatus, the driving assistance method comprising:

a target recognition step of recognizing a target which is present around an own vehicle;

an operation determination step of determining, by using an instantaneous indicator which is an instantaneous value of a parameter regarding steering of the own vehicle, whether a driver has started a collision avoidance operation for avoiding a collision between the own vehicle and the target recognized in the target recognition step;

a timing calculation step of, in a case where it is determined in the operation determination step that the collision avoidance operation has been started, setting a support start timing to be a late timing which is later than the support start timing for a case where the collision avoidance operation has not been started, the support start timing being a timing at which driving assistance for avoiding a collision between the own vehicle and the target or reducing collision damage is started; and a control step of starting the driving assistance based on the support start timing set in the timing calculation step, wherein:

a length of an avoidance initial time period is predetermined, the avoidance initial time period being part of a collision avoidance time period and including a starting time point of the collision avoidance time period, the collision avoidance time period being a time period until a predetermined set time has elapsed after determining that the collision avoidance operation has been started;

until the avoidance initial time period has elapsed, the support start timing is set during the collision avoidance time period to be the late timing; and after the avoidance initial time period has elapsed, a comparison is made between a time-dependent indicator for steering during the avoidance initial time period and a threshold, and based on the comparison the support start timing is maintained during the collision avoidance time period to be the late timing or changes the support start timing during the collision avoidance time period to be the support start timing for the case where the collision avoidance operation has not been started, the time-dependent indicator which being indicated by using the instantaneous indicator at a plurality of timings during the collision avoidance time period.

10. A driving assistance apparatus comprising:

a target recognition section which recognizes a target which is present around an own vehicle;

an operation determination section which determines, by using an instantaneous indicator which is an instantaneous value of a parameter regarding steering of the own vehicle, whether a driver has started a collision avoidance operation for avoiding a collision between the own vehicle and the target recognized by the target recognition section;

a timing calculation section which, in a case where the operation determination section determines that the collision avoidance operation has been started, sets a support start timing to be a late timing which is later than the support start timing for a case where the collision avoidance operation has not been started, the support start timing being a timing at which driving assistance for avoiding a collision between the own vehicle and the target or reducing collision damage is started; and a control section which starts the driving assistance based on the support start timing set by the timing calculation section, wherein:

an avoidance initial time period becomes longer as time elapses, the avoidance initial time period being a time period which is part of a collision avoidance time period and includes a starting time point of the collision avoidance time period, the collision avoidance time period being a time period until a predetermined set time has elapsed after the operation determination section determines that the collision avoidance operation has been started; and the timing calculation section sequentially makes a comparison between a time-dependent indicator for steering during the avoidance initial time period and a threshold, and based on the comparison, the timing calculation section maintains the support start timing during the collision avoidance time period to be the late timing or changes the support start timing during the collision avoidance time period to be the support start timing for the case where the collision avoidance operation has not been started, the time-dependent indicator which being indicated by using the instantaneous indicator at a plurality of timings during the collision avoidance time period.

* * * * *